Patented Jan. 11, 1949

2,458,841

UNITED STATES PATENT OFFICE 2,458,841

RUBBER SOFTENED WITH SULFUR DIOXIDE AND CHLORINE TREATED POLYISOBUTYLENE REACTED WITH AMMONIA

Norman M. Elmore, Elizabeth, and Albert M. Gessler, Cranford, N. J., assignors to Standard Oil Development Company, a corporation of Delaware No Drawing. Application September 20, 1944, Serial No. 555,036

2 Claims. (Cl. 260—45.5)

This invention relates to syntheic polymers; relates especially to softeners for rubber substitutes, and relates particularly to a high molecular weight olefinic polymer which has been treated with sulfur dioxide and chlorine to produce a sulfonyl chloride, reacted with an alkali or amino compound, which is particularly effective as a softener for rubber and rubber substances generally.

Many "rubber" substances are known, including the naturally occurring substance called "caoutchouc," and the synthetic or substitute rubber substances such as the butadiene-containing polymers and the olefinic polymers generally, whether prepared by emulsion polymerization at room temperature or by polymerization at low temperatures by a Friedel-Crafts catalyst; which substances can be "cured" or vulcanized to yield materials which are capable of a substantial elongation under tension and forcible retraction to approximately original size and shape upon the release of tension; with tensile strengths ranging from 700 to 4500 pounds per square inch and elongations at break ranging from 250% to 1200%; which materials are valuable and important structural materials. However, these materials as originally produced tend to be leathery, dry and harsh, and difficult to process on the mill or otherwise for the necessary compounding and forming.

In order to avoid these compounding difficulties, a considerable number of softeners have been suggested, including a wide range of hydrocarbons, many esters and the like, but to the present no satisfactory softener has been obtained. Those softeners which are liquid are extremely difficult to mill into the rubbery substance, while those softeners which are solid are low in softening efficiency and tend to interfere with the curing of the rubber and to cause serious reductions in tensile strength.

The present invention provides a softener which is particularly effective with the group of polybutadiene polymers and copolymers which is in the form of a semi-solid, which is very easily milled into the rubber, and which provides a highly efficient softening effect without serious injury to the physical properties of the rubber. The softener of the present invention consists of an olefinic polymer such as polyisobutylene or polyethylene or polypropylene or the like. Any of the olefinic materials which are polymerizable, having from 2 to 8 or 10 carbon atoms per molecule, are useful as the raw material for the softener of the present invention. These polymers are treated with chlorine and sulfur dioxide to yield a sulfonyl-chloride, which in turn is treated with a convenient alkali or amino-containing compound to yield an ester or amide type of material. This material is then milled into the desired rubber, and in proportions from 5% to 40% yields a highly efficient softening action. Other objects and details of the invention will be apparent from the following description.

The raw material for the softener of the present invention may be any convenient olefinic polymer having a molecular weight from 1,000 to 20,000 or even as high as 500,000. Polyisobutylene, having a molecular weight ranging from about 2,000 to 10,000 or 15,000, is the preferred material. Polyethylene is a satisfactory material, polypropylene, poly-normal-butylene, polypentene, polyhexene and the like up to 8 or 10 carbon atoms, are equally satisfactory. Molecular weight ranges from about 2,000 up to the highest obtainable are also usable.

Of these materials, polyisobutylene is preferaby produced by a low temperature polymerization, at temperatures ranging from 6° C. down to —164° C., by the application to the cold olefin of a Friedel-Crafts catalyst such as boron trifluoride or titanium tetrachloride or aluminum chloride in solution in a low-freezing, non-complex forming solvent such as ethyl or methyl chloride or carbon disulfide or the like. At the temperatures near the top limit, molecular weights from 2,000 to 10,000 are produced and these are the preferred materials.

Other forms of isobutylenic polymers are also satisfactory including the oily type of polymers produced by Friedel-Crafts catalysts at temperatures at or near room temperature, and the copolymers of isobutylene with diolefins having from 4 to 12 or 14 carbon atoms per molecule. Similarly, the various polymers and copolymers containing, or prepared from, the polyolefins such as polybutadiene, polyisoprene, polymethylpentadiene, and the like, are similarly useful.

Polyethylene, produced by pressure polymerization at pressures ranging from 100 to 5,000 atmospheres at temperatures ranging from 50° C. to 150° C. also is satisfactory.

Polypropylene, produced at temperatures from 0 to —103° C. by the application to the cold propylene of large quantities of concentrated solutions of Friedel-Crafts catalysts, also is satisfactory.

In preparing the softener of the present invention the polymer is conveniently dissolved in a non-reactive solvent such as carbon tetrachloride, ethylene dichloride, chloroform, carbon disulfide and other halogenated hydrocarbon solvents having a dielectric constant below 8, and treated, preferably in the presence of ultra-violet light, with a mixture of elemental chlorine and sulfur dioxide in which the sulfur dioxide is in considerable excess above equi-molecular proportions, from 2 to 5 molecular parts of sulfur dioxide per 1 molecular part of chlorine being preferred. The reaction proceeds rapidly to yield a solution of the desired sulfonyl chloride.

The material is, however, somewhat unstable, and accordingly, it is undesirable to attempt to purify the material or even to separate it from the solvent. Accordingly, there is added to the solution of polymer sulfonyl chloride in solvent a stabilizing or neutralizing agent which will combine with the sulfonyl chloride group to remove the unstable chlorine. This material may be any of the inorganic alkaline substances such as caustic soda, caustic potash, lime, sodium carbonate, and the like; or may be organic substances capable of reacting with the chlorine to form other substituents including the alcoholates such as sodium ethylate, sodium methylate, sodium propylate and the like; or may be organic salts such as sodium salts of the organic acids; or mercaptans, or the like; or may be ammonia, or may be a substituted ammonia of any type including all of the amino compounds and amino derivatives.

The treatment with the reactive compound; the alkali, the alcoholate, the ammonia or amino compound, or the like, may consist merely of boiling the solution of polymer-sulfonyl chloride compound with the reactive alkaline compound for a convenient time interval which may range from a few minutes to several hours. In view of the desirability of recovering the solvent, this boiling is conveniently conducted in a reflux condenser. At the end of the treatment, the polymer compound remains in solution in the solvent, and any residues or byproducts may be removed by washing the solution with water. The solution may then be dried and the solvent evaporated out, to leave behind the softener substance of the present invention.

The softener is then milled into the rubber in any convenient way, from 5 parts per 100 of rubber to 40 parts per 100 of rubber being used. This milling is particularly easy, since the softener and the rubber substance need merely be put on the mill together. The rubber may be milled briefly first, if desired and the softener then added, or the rubber and the softener may be put on the mill simultaneously. In either event, the material "bands" quickly and easily, and shows little or no tendency towards "lacing" on the mill. Instead, the material forms a smooth, even layer around the front roll with a body of surplus in the bite of the roll, to which it is extremely easy to add any desired compounding ingredients such as pigments, fillers, curing agents, and the like. The resulting mixture or composition of matter not only "bands" readily on the mill, but also extrudes and calenders very smoothly and easily, and upon curing, shows a very low extractability in hydrocarbon liquids, slight increase in swelling properties in hydrocarbon liquids, a significant increase in tensile strength, and a substantial decrease in elongation and an advantageous increase in modulus, compared to vulcanizates containing other softeners, especially with the butadiene polymers.

The high modulus and low elongation indicate high state of cure. It will be noted in Table II that higher tensiles, higher moduli and higher elongations are obtained with claimed softener than with others shown. Control stocks are those containing other softeners.

EXAMPLE 1

A quantity of polyisobutylene having a molecular weight according to the Staudinger method of approximately 3,000 was dissolved in 5 parts of carbon tetrachloride per part of polymer and treated with a mixture of sulfur dioxide and chlorine present in the ratio of 3 parts of sulfur dioxide per 1 part of chlorine. The treatment was conducted under an ultra-violet light and the gases were bubbled into the mixture with an alundum thimble to get as good dispersion as possible of the gases in the solution and the treatment was conducted for a time interval of approximately 12 hours at a temperature between 60° C. and 65° C. The effluent gas consisted of hydogen chloride, the excess sulfur dioxide and traces of chlorine. At the end of the 12-hour period, the solution was treated with an excess of concentrated ammonium hydroxide and the mixture was evaporated by heat to boil off the excess ammonia, the water and the carbon tetrachloride. The resulting product was a soft semi-solid resinous material, distinctly more solid than the original polymer. The material was analyzed and found to contain

| | Percent |
|---|---|
| Chlorine | 14.5 |
| Sulfur | 3.1 |
| Nitrogen | 3.4 |

This analysis shows the presence in the material of substancial quantities of chlorine and sulfur, and the presence of substantial quantities of nitrogen from the ammonium. All three of these materials were introduced by the treatment applied to the polymer, since the polymer as such contained only carbon and hydrogen.

It will be noted that there is present also a substantial amount of nitrogen, which is extremely helpful in accelerating the rate of cure of any "rubber" into which the softener is compounded.

For purposes of comparison a series of compounds were made, utilizing as the rubbery material, a sample of butadieneacrylo nitrile polymer prepared by the emulsion polymerization technique known as "Perbunan."

In the preparation of this rubber or "Perbunan," a mixture of approximately 74 parts by weight of butadiene and 26 parts by weight of acrylonitrile were added to 200 parts by weight of water containing 1.5 parts by weight of sodium laurate and 1 part by weight of sodium peroxide. This material was stirred vigorously for a time interval of 48 hours, at the end of which time the emulsion was coagulated by admixing into the emulsion an equal volume of saturated brine solution. The polymer was then washed to remove as much as possible of the soap and was then dried.

Four different portions of this polymer were then separately treated on the mill, one without softener, a second with tributoxy ethyl phosphate, a third with polymerized linseed oil substance softener known as "Plasto-gel OV-309" and a fourth with the softener of the present invention. The polymer alone was practically impossible to mill satisfactorily, and was extremely difficult to extrude or calender. The addition of tributoxy ethyl phosphate improved the milling properties and slightly improved the extrusion and calendering properties but yielded only a very rough and wholly unsatisfactory product from the extruder and calender. The third portion, milled with Plasto-gel, was somewhat better and yielded a reasonably satisfactory material, except for an undesirably low film strength. The Plasto-gel, however, yielded a very serious reduction in the cure rate, as will be evident from Table II. The fourth sample milled with the treated polymer softener of the present invention yielded an extremely short milling time, an excellent Mooney viscosity, an excellent extrusion property, excellent calendering properties and a highly advantageous increase in cure rate. These results are summarized numerically in the following table:

Another four portions of the same polymer were taken and separately compounded according to the subjoined Table II, one batch being compounded without any softener, a second batch being compounded with Plasto-gel, a third batch being compounded with tributoxy ethyl phosphate and a fourth batch with the softener of the present invention, all of the samples being compounded with zinc oxide, stearic acid, sulfur, Altax and carbon black. These materials were tested for plasticity and for extrusion rate. Portions were then cured at 287° F. for varying times ranging from 15 to 90 minutes, and the tensile strength, elongation at break, modulus at 300% and shore hardness determined. Additional samples were then oven aged for 22 hours at

TABLE I

*Processing characteristics*

| 5520 | 1 | 2 | 3 | 4 |
|---|---|---|---|---|
| Formulae: | | | | |
| Perbunan 26 | 100 | 100 | 100 | 100 |
| Tributoxy ethyl phosphate | | 20.0 | | |
| Plasto-gel OV-309 | | | 20.0 | |
| Polyisobutylene sulfonyl chloride treated with ammonia | | | | 20.0 |
| Breakdown | yes | yes | none | none |
| Time for breakdown | 10′ | 10′ | | |
| Time for softener addition | 0 | 12′ | 5′ | 3′ |
| Total mixing time | 10′ | 22′ | 5′ | 3′ |
| Mooney Viscosity @ 212° F | 95 | 34 | 40 | 48 |
| Extrusion Rate (½ inch Royal Extruder @ 180° F.): | | | | |
| 1. Inches per minute | 52 | 49 | 92 | 74 |
| 2. Grams per minute | 207 | 245 | 260 | 240 |
| 3. Swell Index [1] | 4.0 | 5.0 | 2.8 | 3.2 |
| 4. Appearance [2] | 10.0 | 8 | 1 | 2 |
| Calendering Data (6″ wide—0.015″ gauge) (Top roll 180° F., center 150° F.): | | | | |
| 1. Length in inches after cooling | | 80 | 100 | 90 |
| 2. Width in inches after cooling | Not calenderable; laces and pulls apart. | 6⁷⁄₁₆ | 6¼ | 6½ |
| 3. Gauge in inches after cooling | | 0.038 | 0.025 | 0.031 |
| 4. Appearance [2] | | 10 | 3 | 3 |

[1] Indicates swell after extrusion obtained by dividing grams per minute by inches extruded per minute.
[2] 1=glossy smooth to 10=very rough.

This table shows the very great gain in ease of processing by the use of the softener of the present invention compared to other typical softeners. It is believed that this effect is due in part to the comparatively high molecular weight of the original polymer in the softener and in part to the presence of chlorine, sulfur and nitrogen in the polymer.

212° F. after curing for 60 minutes at 287° F. and the tensile strength, elongation at break, modulus at 300% and shore hardness determined after oven aging, and the percent retention of values determined. Still other samples were aged in the oxygen bomb for fourteen days and similar determinations made. The values of these results are shown in the subjoined Table II.

TABLE II

*Comparative effect of various plasticizers on perbunan vulcanizates in a typical tread recipe*

| 5521 | 1 | 2 | 3 | 4 |
|---|---|---|---|---|
| Formulae: | | | | |
| Perbunan 26, Batch 14 (Broken down on cold mill) | 100.0 | 100.0 | | |
| Perbunan 26, Batch 14 (No Breakdown) | | | 100.0 | 100.0 |
| Tributoxy ethyl phosphate | | 20.0 | 20.0 | |
| Plasto-gel OV-309 | | | | |
| Polymer Sulfonyl Chloride | | | | 20.0 |
| Zinc Oxide | 5.0 | 5.0 | 5.0 | 5.0 |
| Stearic Acid | 1.0 | 1.0 | 1.0 | 1.0 |
| Sulfur | 1.5 | 1.5 | 1.5 | 1.5 |
| Altax | 1.0 | 1.0 | 1.0 | 1.0 |
| Medium Particle Channel Black (Kosmobile 66) | 50.0 | 50.0 | 50.0 | 50.0 |
| Test Data: | | | | |
| Williams Plasticity—Recovery (5 Kg. @ 70° C.) | 241–88 | 140–25 | 222–97 | 220–86 |
| Extrusion Rate @ 200° F.— | | | | |
| 1. Inches per minute | 54 | 62 | 68 | 66 |
| 2. Grams per minute | 125 | 161 | 146 | 123 |
| 3. Swell Index | 2.31 | 2.60 | 2.15 | 1.86 |
| Stress Strain: | | | | |
| Tensile Strength—Elongation } 15′ | 4135–684 | 3635–735 | 785–960 | 3060–588 |
| Modulus @ 300° F.—Shore (cured at 287° F.) | 820–58 | 500–49 | 160–42 | 845–55 |
| Tensile Strength—Elongation } 30′ | 4895–625 | 3450–650 | 1770–858 | 3545–516 |
| Modulus @ 300° F.—Shore (cured at 287° F.) | 1135–61 | 570–49 | 300–49 | 1265–59 |
| Tensile Strength—Elongation } 45′ | 4519–624 | 3220–626 | 2170–775 | 3735–480 |
| Modulus @ 300° F.—Shore (cured at 287° F.) | 1275–64 | 645–49 | 430–50 | 1535–59 |
| Tensile Strength—Elongation } 60′ | 4515–538 | 3395–630 | 2305–774 | 2985–444 |
| Modulus @ 300° F.—Shore (cured at 287° F.) | 1410–64 | 605–50 | 400–50 | 1450–58 |
| Tensile Strength—Elongation } 90′ | 4900–548 | 2650–542 | 2385–747 | 3065–428 |
| Modulus @ 300° F.—Shore (cured at 287° F.) | 1460–64 | 605–51 | 445–50 | 1640–61 |

TABLE II—Continued

| 5521 | 1 | 2 | 3 | 4 |
|---|---|---|---|---|
| Aging, Oven—22 hrs. @ 212° F. (cured 60' @ 287° F.): | | | | |
| Tensile—Elongation | 2953-635 | 2325-235 | 3978-393 | 3213-465 |
| Modulus @ 300%—Shore | 925-67 | 2325-64 | 2540-56 | 1495-69 |
| Per Cent Retention of— | | | | |
| Tensile—Elongation | 65-118 | 68-37 | 158-50 | 108-105 |
| Modulus at 300%—Shore | 66-105 | 345-128 | 625-112 | 103-119 |
| Aging, Oxygen Bomb, 14 days 300#/sq. in. at 158° F. (cured 60' @ 287° F.): | | | | |
| Tensile—Elongation | 2880-415 | 3215-480 | 2390-550 | 2630-300 |
| Modulus @ 300%—Shore | 2965-64 | 1730-59 | 1000-54 | 2630-37 |
| Per Cent Retention of: | | | | |
| Tensile—Elongation | 86-77 | 95-76 | 104-71 | 88-68 |
| Modulus @ 300%—Shore | 210-100 | 260-152 | 250-108 | 182-108 |

These results show a very great improvement in time of processing, ease of processing and satisfactory quality of processing without serious loss from the presence of the softener and without serious slowing down of curing time. It will be noted from Table II that the results are uniformly better than the other softener substances.

EXAMPLE 2

A portion of the butadiene-styrene emulsion polymer known as "Buna S" was compounded according to Recipe 2 given below:

| | Parts by weight |
|---|---|
| Buna S | 100.0 |
| Zinc oxide | 5.0 |
| Stearic acid | 2.0 |
| Sulfur | 2.0 |
| Easy processing Channel Black (Cabot #9) | 50.0 |
| Captax (2-mercapto benzothiazole) | 1.5 |
| Polyisobutylene sulfonyl chloride reacted with ammonia | 10.0 |

The softener of the present invention was added directly to the unmasticated polymer on the double roll mill. The softener milled into the polymer at a very rapid rate of speed; the mixture banded excellently and quickly, and the other substances in the recipe were added much more easily and satisfactorily, and in less time than has been found possible with any other softener; to yield a product which cured rapidly and easily to an excellent tensile strength and adequate elongation.

EXAMPLE 3

Natural rubber, caoutchouc, in the form of smoked sheet, was compounded according to Recipe 3 below:

| | Parts by weight |
|---|---|
| Smoked sheet | 100.0 |
| Zinc oxide | 3.0 |
| Stearic acid | 3.0 |
| Sulfur | 3.0 |
| Captax (2-mercapto benzothiazole) | 1.0 |
| Easy processing Channel Black (Cabot #9) | 45.0 |
| Agerite resin-D | 1.0 |
| Polyisobutylene sulfonyl chloride reacted with ammonia | 5.0 |

In this instance also the compound was very easily prepared to yield a highly satisfactory raw compound, which calendered and extruded smoothly, easily and very satisfactorily; which cured rapidly to yield a material of excellent strength and elongation. It may be noted that smoked sheet inherently is very tough, and ordinarily the processing requires that the smoked sheet be broken down on the mill for a considerable length of time before the addition of the compounding agents can be started. In the presence of a softener of the present invention, much less breakdown is required, greatly shortening the pre-mastication period, and accordingly improving the ease of addition of the other compounding agents. The lesser amount of breakdown on the mill yields a cured product of very much superior physical properties.

EXAMPLE 4

A compound was prepared from the isobutylene-diolefin low temperature interpolymer known as butyl, according to Recipe 4 below:

| | Parts by weight |
|---|---|
| Butyl | 100.0 |
| Zinc oxide | 5.0 |
| Stearic acid | 1.0 |
| Sulfur | 1.5 |
| Tetramethyl thiuram disulfide (TUADS) | 1.0 |
| Captax (2-mercapto benzothiazole) | 0.5 |
| Easy processing Channel Black (Cabot #9) | 45.0 |
| Polyisobutylene sulfonyl chloride reacted with ammonia | 10.0 |

Butyl rubber does not ordinarily require breakdown on the mill, but it is difficult to mill and extrude because of a very bad tendency to "lace" on the mill, and to swell in the extruder. The immediate addition of the softener of the present invention to the polymer eliminates the tendency towards lacing on the mill and increases the plasticity sufficiently to shorten very greatly the time of filler addition. Also, the milling is greatly shortened, and the cured product is definitely improved in physical properties.

In the above examples the product used under the name of "Perbunan" is a copolymer of butadiene with acrylonitrile produced by emulsion polymerization at temperaturess ranging from 30 to 55° C., the emulsion being maintained by the presence of a soap, in the present instance sodium laurate, the polymerization being speeded by the presence of a peroxide catalyst, specifically sodium persulfate.

The smoked sheet indicated in Recipe 3 was a good grade of caoutchouc of the type known as "Up River Para."

The butyl used in Example 4 was a sample of a polymer of isobutylene with isoprene known to the trade as "GR-I" containing approximately 1.5% of isoprene; prepared at a temperature of about —98° C. in the presence of liquid ethylene by the application to the mixed olefins of aluminum chloride in solution in methyl chloride, the polymer being broadly that disclosed in United States Patent No. 2,356,128 issued August 22, 1944, to Sparks and Thomas; the butyl having a molecular weight (as determined by the Staudinger method) of approximately 55,000. The compound of Recipe 4, after curing for thirty minutes at a temperature of 307° F., had a tensile strength of nearly 3,000 pounds per square inch and an elongation at break of approximately 1200%.

Thus, the composition of matter of the invention provides a new composition of matter, including a new polymer compound which is uniquely effective as a processing aid and a softener.

While there are above disclosed but a limited number of embodiments of the process and product of the present invention, it is possible to provide still other embodiments without departing from the inventive concept herein disclosed and it is therefore desired that only such limitations be imposed upon the appended claims as are stated therein or required by the prior art.

The invention claimed is:

1. A composition of matter comprising in combination a vulcanizable rubber selected from the group consisting of caoutchouc, the rubbery polymers of butadiene prepared in aqueous emulsion and the rubbery copolymer of a major proportion of isobutylene with a minor proportion of isoprene prepared by the addition of a Friedel-Crafts catalyst at low temperature; and between 5 and 40 percent per weight of rubber of a softener containing combined chlorine, sulfur and nitrogen prepared by the steps of dissolving in a chlorine resistant solvent a polymer of isobutylene having a molecular weight between 2,000 and 20,000, treating the polymer solution under the assistance of ultra violet light and heat with a mixture consisting of 2 to 5 parts of sulfur dioxide and 1 part of chlorine until substantial amounts of sulfur dioxide and chlorine are combined into the polymer, treating the resulting polymer derivative with ammonia and recovering the resulting polymeric softener.

2. In the method of softening a rubbery emulsion copolymer of butadiene and acrylonitrile, the step of mechanically working into a copolymer 5 to 40 percent based on the weight of said copolymer of a softener containing 14.5 percent of chlorine, 3.1 percent of sulfur and 3.4 percent of nitrogen, prepared by the steps of dissolving polyisobutylene having a Staudinger molecular weight of 3,000 in carbon tetrachloride, heating the resulting solution at a temperature between 60° C. and 65° C. in the presence of ultra violet light, bubbling through the heated solution a gas mixture consisting essentially of 3 parts of sulfur dioxide and 1 part of chlorine until the desired amount of said gases is combined in the polyisobutylene, treating the solution with an excess of concentrated ammonium hydroxide and recovering the resulting softener.

NORMAN M. ELMORE.
ALBERT M. GESSLER.

REFERENCES CITED

The following references are of record in the file of this patent:

UNITED STATES PATENTS

| Number | Name | Date |
|---|---|---|
| 2,152,828 | Thomas | Apr. 4, 1939 |
| 2,202,791 | Fox | May 28, 1940 |
| 2,212,786 | McQueen | Aug. 27, 1940 |
| 2,234,215 | Youker | Mar. 11, 1941 |
| 2,259,671 | Voorhees | Oct. 27, 1941 |
| 2,325,947 | Garvey | Aug. 3, 1943 |
| 2,334,186 | Fox | Nov. 16, 1943 |
| 2,351,735 | Bake | June 20, 1944 |

FOREIGN PATENTS

| Number | Country | Date |
|---|---|---|
| 542,414 | Great Britain | Jan. 8, 1942 |

OTHER REFERENCES

Vanderbilt Rubber Handbook, 1942, pages 26 and 27.